United States Patent Office 3,574,548
Patented Apr. 13, 1971

3,574,548
PROCESS FOR MANUFACTURING A CELLULAR CARBON BODY
Arthur F. Sands, Oak Ridge, and Michael E. Scrivner, Knoxville, Tenn., assignors to the United States of America as represented by the United States Atomic Energy Commission
No Drawing. Continuation-in-part of application Ser. No. 641,428, May 19, 1967. This application Aug. 11, 1969, Ser. No. 849,204
Int. Cl. C01b *31/02*
U.S. Cl. 23—209.4                        9 Claims

ABSTRACT OF THE DISCLOSURE

A rigid carbon foam is prepared by admixing furfuryl alcohol which has been partially polymerized so as to include less than about 12 percent free or unreacted furfuryl alcohol with a foaming agent such as a two-component polyurethane system for producing a cellular mass. This mass is then cured and subsequently carbonized at a temperature of about 1000° C. to 2500° C. to provide a product of essentially pure carbon that is characterized by its cellular structure, dimensional stability in environments of changing humidity, a density in a range of about 0.02 to 0.80 gram per cubic centimeter, and a compressive strength which may be up to about 10,000 pounds per square inch. The density can be increased up to about 1.0 gram per cubic centimeter with the addition of about 15 to 20 weight percent graphite flour.

---

This application is a continuation in part of applicants' copending application, Ser. No. 641,428, filed May 19, 1967, now abandoned.

The present invention relates generally to rigid cellular structures, and more particularly to rigid carbon foams which exhibit high compressive strengths at many densities, are dimensionally stable in environments of high or changing relative humidity, and are particularly suitable for high temperature applications. This invention was made in the course of, or under, a contract with the U.S. Atomic Energy Commission.

Rigid cellular structures, because of their relatively high mechanical strengths and low bulk densities, have enjoyed widespread usage throughout industry in various applications such as structural supports, lightweight fillers for structural applications, construction materials, thermal and electrical insulation, etc. However, many of the presently available cellular structures suffer several drawbacks or shortcomings which detract from their usefunless in high temperature and/or high humidity environments. For example, commercially available rigid urethane foams offer excellent strength properties at relatively low bulk densities, but also lack dimensional stability in high humidity environments or when subjected to wide variations in humidity. Another drawback to these urethane foams is that they cannot be used in high temperature environments since most urethanes undergo thermal decomposition at a temperature between about 300° and 400° C. Such thermal decomposition causes the evolution of toxic products and produces a somewhat brittle and weakly joined carbon structure which is readily subject to breakage. Efforts to provide a foamed product which is of high strength and low bulk densities and yet is dimensionally stable when subjected to high or varied humidities and useable in high temperature environments up to about 2500° C. have met with some success. Perhaps one of the more successful foam systems believed to be capable of providing these features is that set forth in assignee's U.S. Pat. No. 3,345,440, issued Oct. 3, 1967, and entitled "Method for Manufacturing Foam Carbon Products." The foamed product of interest in this patent is a rigid carbon foam produced by admixing a binder of partially polymerized furfuryl alcohol with a two-component urethane system and water to provide a foam which is then cured and subsequently heated to a temperature sufficient to thermally decompose the urethane and carbonize the furfuryl alcohol binder. The resulting rigid structure is a cellular, high strength, low bulk density carbon foam which may be readily employed in environments up to about 2500° C. and which undergoes ltitle or no dimensional changes when subjected to varied or high humidity conditions. While this carbon foam provides desirable properties with respect to employment in certain environments, it also possesses some other properties which tend to somewhat prevent or detract from the usage of this carbon foam in other applications. For example, the fabrication of low density carbon foam, i.e., foam of less than about 0.04 gram per cubic centimeter (gm./cc.), into configured products such as hollow or solid hemispheres, cubes, etc., was achieved with any success only with molds providing castings with less than about a 21-inch diameter or cross section since deleteriously large cracks readily developed in products of greater size due to the presence of excessive free or unreacted furfuryl alcohol in the binder, as will be discussed in detail below. Further, the density of these larger products was necessarily maintained within a relatively low range (a maximum of about 0.15 gm./cc. without a high density loading or filler material) since it was found that a polymerized furfuryl alcohol-to-urethane ratio greater than about 0.45 to 1 could not be employed without introducing undesirable cracking and/or the formation of excessively large voids in the product. The compressive strength of this earlier carbon foam was also less than that desirable for use in some applications in that the compressive strengths of these foams averaged about 50 p.s.i. with an upper limit of less than about 200 p.s.i. when using carbon foam having a density of about 0.10 gm./cc. The addition of graphite to the carbon foam can be utilized to increase its density and somewhat increase its compressive strength, but for carbon foams of the same density the foam formulation containing the graphite additive is usually the one of lower compressive strength.

It is therefore the aim of the present invention to overcome or substantially minimize the above and other shortcomings or drawbacks by providing a rigid carbon foam which represents a significant improvement over the carbon foam set forth in the above-mentioned patent. With respect to these earlier carbon foams, the carbon foam of the present invention provides for a much wider range of densities which may be in the order of about 0.02 to 0.80 gm./cc. without the addition of fillers, an increase in compressive strength to a maximum of more than 10,000 p.s.i. which represents a strength increase by a factor of more than 50, the fabrication of products larger than those previously obtainable as well as the fabrication of such products with carbon foams of greater densities, and a substantial increase in hardness in that the carbon foams of the present invention, when of the higher densities, are highly resistant to penetration or cutting by ordinary hacksaws, whereas the earlier carbon foam exhibited little resistance to such cutting regardless of density. These and other unique features are obtained by employing a foam formulation and manufacturing method somewhat similar to that used in producing the carbon foam set forth in the above-mentioned patent since, in both instances, a viscous liquid resin binder of partially polymerized furfuryl alcohol is admixed with a blowing agent and, in some instances, other materials with this mixture then being cured and subsequently carbonized. However, the partially polymerized furfuryl alcohol binders are different in that the binder indicated as being commercially available in the above-mentioned patent contains a quantity of unpolymerized or unreacted furfuryl alcohol corresponding to approximately 25 percent of the total molecules as determined by gel permeation chromatograph analysis, whereas the partially polymerized furfuryl alcohol binder of the present invention contains less than about 12 percent unreacted or free furfuryl alcohol as determined by the same chromatography technique. This difference is significant and critical since the substantial improvements in the carbon foam product such as mentioned above cannot be realized with the previously employed binder. For example, foam formulations employing partially polymerized furfuryl alcohol containing more than 12 percent free furfuryl alcohol cannot be used successfully for castings greater than about 21 inches in diameter because the excessive internal heat generated during the carbonization of the foam due to such free furfuryl alcohol causes "burnout" of the carbon that results in cracks and cell collapse.

Accordingly, an object of the present invention is to provide a new and improved rigid carbon foam.

Another object of the present invention is to provide an improved carbon foam which is particularly suitable for use in environments wherein temperatures up to about 2500° C. are encountered or wherein the humidity is somewhat variable or very high.

A further object of the present invention is to provide an improved carbon foam characterized by being producible with a density in the range of about 0.02 to 1.0 gm./cc., a compressive strength up to about 10,000 p.s.i. or more with the high density foams, and the formation of products of virtually any desired size, shape, or configuration.

Generally, the carbon foam of the present invention may be produced by mixing a viscous thermosetting resin—namely, partially polymerized furfuryl alcohol containing less than about 12 percent of unreacted furfuryl alcohol, with a foaming, e.g., urethane system, agent; curing the resulting foamed mixture at room temperature for a sufficient duration (10 to 20 days) to produce a stable cellular mass; and thereafter heating the mass in a non-reactive atmosphere to a temperature sufficient to convert the resin to carbon and completely decompose the foaming agent or at least decompose it sufficiently to where the cellular product is virtually carbon with perhaps a minor portion of the total carbon content being contributed by the foaming agent. Also, the carbon foam may include some impurities or materials derived from the foaming agent or other additives and fillers, as will be discussed below.

Described in greater detail, the carbon foam of this invention is primarily formed by the carbonization of the thermosetting resin binder after it is formed into a cellular structure by the foaming agent. As briefly mentioned above, this thermosetting resin is partially polymerized furfuryl alcohol which contains a quantity of free or unreacted furfuryl alcohol corresponding to less than 12 percent of the total quantity of molecules in the binder. The exact extent of polymerization which any given quantity of furfuryl alcohol undergoes is very difficult to control and measure. However, for the purpose of this invention the use of gel permeation chromatography, percent of resin solids, viscosity, and hydroxyl numbers together have been found to be reliable mechanisms for determining or estimating the degree of polymerization which is acceptable for producing the carbon foam products envisioned by this invention. For example, upon various samplings of the commercially available partially polymerized furfuryl alcohol binder described in the above-mentioned patent and employed in the production of carbon foam, it was found that the binder possessed at least about 25 percent free or unreacted furfuryl alcohol, about 53 weight percent resin solids, a viscosity less than 1000 centipoises at 25° C., and hydroxyl numbers ranging from about 250 to 270. On the other hand, selected samplings of the partially polymerized furfuryl alcohol binder employed in the present invention provided data showing less than 12 percent or unreacted furfuryl alcohol, 75 to 80 weight percent resin solids, a viscosity in the range of 10,000 to 15,000 centipoises at 25° C., and a hydroxyl number in a range of about 100 to 140. The hydroxyl number is preferably in a range of about 130 to about 135. However, if desired, partially polymerized furfuryl alcohol binders having a hydroxyl number lower than 100 may be employed, but care should be exercised when using such binders since their viscosity may be excessively great so as to result in poor mixing of the formulation which may cause cracks, large voids, or density variations.

In order to obtain the partially polymerized furfuryl alcohol binder which is capable of providing the carbon foams of this invention the binder disclosed in the above-mentioned patent may be modified by a "cooking" procedure. This procedure involves the heating of this commercially available binder to a temperature of about 120°–125° C. for a period of about 24 to 72 hours and accomplishes the polymerization of a substantial percentage of the unreacted or free furfuryl alcohol normally present in the binder. Some volatiles including water are drive off by such cooking and additional polymerization is accomplished so as to provide a viscous resin having less than about 12 percent unreacted furfuryl alcohol for use in producing the carbon foam of the present invention. Preferably, the quantity of free or unreacted furfuryl alcohol in the binder is in the range of about 5 to 10 percent.

The foaming or gas producing agent for providing the desired porosity in the foam product of the present invention must necessarily be compatible with the binder. Accordingly, while several gas producing substances such as the carbon dioxide gas producing carbonates or metallic carbonyls may be employed, a urethane system is preferred since the porous carbon product produced by using this system exhibits substantially better strength properties and other desirable characteristics than provided by other known foaming agents. This urethane system may be composed of selected urethane chemicals well known in the art for producing cellular urethane products but is preferably a two-component system comprising tolylene diisocyanate ("C" or "T" component) and a polyhydric alcohol resin ("R" component). The component containing the tolylene diisocyanate may be reacted with some of the R component to provide a T component containing a prepolymer and an excess of tolylene diisocyanate. The R component contains some water which reacts with the isocyanate to produce carbon dioxide gas for effecting the foaming of the mixture. Additional water may be added to the mixture to provide the necessary quantity of carbon dioxide for providing the desired cell size or density of the foam. The reaction of the T and R components is an exothermic reaction which yields a cross-linked structure for providing the foam and the carbon product with desirable strength features.

In order to accelerate further polymerization or cross linking of the urethane system, a catalyst such as N-methyl morpholine, a tertiary amine such as triethylamine, or a salt such as stannous octoate is preferably utilized. The addition of about 0.5 to 1.0 weight percent of any of these catalysts to the mixture has been found satisfactory. However, it may be desired to use a greater quantity of the above or other catalyst when using mixtures of the higher binder-to-urethane ratios for accelerating gelation and urethane polymerization and thereby providing a more rigid structure for inhibiting or preventing slumping. The reaction between these urethane components may also be accelerated by placing the mixture in an atmosphere heated to a temperature of about 70° C. for several minutes.

In addition to the use of catalysts, it is also preferred to use a surfactant such as silicone or any other suitable nonionic material to stabilize or regulate cell size.

The carbon foam of the present invention may be produced by initially mixing a desired quantity of the urethane R component with a desired quantity of the thermosetting resin binder suitable for producing a single carbon foam product. After stirring this mixture for a suitable duration, e.g., 5 minutes, the T component of the urethane system is added and the stirring continued for about 1 to 4 minutes depending upon the reactivity of the mixture. This mixture is then preferably poured into a mold of a desired configuration and of a material such as aluminum before the foaming action begins or is of any significance. It may be desirable to coat the mold surfaces contacting the foam mixture with a suitable mold-release material such as a silicone mold-release compound. The casting may then be maintained at room temperature while the foam rises or "blows" to its maximum height, which usually takes place in a time period of less than about one hour. Gelation is usually well advanced by the time the maximum height of the casting is attained and is usually sufficiently firm after about 16 hours of curing at room temperature to permit further processing. With the foam cured at room temperature for a duration sufficient to instill sufficient firmness in the foam to permit handling (usually about two hours after the foaming action is initiated), the casting may be removed from the mold so as to permit the rigid "skin" or "rind" formed on the foam during the cure period to be treated for facilitating outgassing during the subsequent curing and carbonization steps. This treatment may be achieved by scoring the rind with a suitable instrument, e.g., a saw, at about 0.5-inch intervals with each cut or incision being about 0.5 inch in depth. However, if desired, the rind may be removed for the same purpose. Such removal may be accomplished by any suitable mechanical means, e.g., a metal rasp. After the casting has become sufficiently firm and the rind scored or removed, the foam material is further cured in air at room temperature for a duration in the range of 10 to 20 days.

Following the above-described curing operation, the castings may be transferred to a high temperature oven or furnace, e.g., a conventional muffle furnace, provided with an inert non-oxidizing atmosphere, e.g., nitrogen, argon, and the like. Within this high temperature furnace the casting is subjected to a temperature sufficient to convert the urethane-binder composition to carbon. A temperature found to be satisfactory for this purpose is above about 450° C., but is preferably about 950°–1000° C. During this high temperature bake the furnace is preferably programmed to provide a slow rate of temperature increase from about 180° C. up to the desired carbonizing temperature for assuring that the thermal gradient between the outside and inside of the casting is not excessively large since such a condition would result in deleteriously high internal pressures due to gases escaping at too slow a rate. This high temperature bake may take place over a period of time ranging from about 36 hours up to about 240 hours depending on the density and size of the casting. The high density or larger castings require the longer bake cycles due to the desirability of a slower rate of temperature increase. In fact, in some instances, such as with very high density material, it may be desirable to use a bake time longer than 240 hours.

The porous carbon structure resulting from the carbonization of the foam casting at about 1000° C. is formed primarily of the carbonized binder with a minor percentage of the carbon coming from the urethane since this material is virtually completely decomposed. There are, however, some ash (about 0.3 percent, mostly silicon) and some impurities such as about 0.07 percent chlorine and about 4.67 percent nitrogen. The silicon is believed to come from the silicone surfactant, which may be replaced with another nonionic surfactant if it is desired to reduce the quantity of silicon. The ash and other impurities may be removed from the carbon product by heat treating or baking the latter at a higher temperature upon completing the 1000° C. bake.

The densities of the unfilled carbon foams fabricated in accordance with the invention range from about 0.02 to about 0.8 gm./cc. These densities may be regulated by controlling the binder-to-urethane ratio and the quantity of water in the reactants. With the increase of the binder-to-urethane ratio from a low of about 0.45 to 1 up to a maximum of about 2.2 to 1, the density of the product correspondingly increases up to about 0.8 gm./cc. when using a minimal fixed quantity of water in the reaction. However, by increasing the water in the mixture, the density of the foam product is correspondingly lowered as more water is added. For example, with a binder-to-urethane ratio of 1.1 to 1 and with a normal quantity of water, i.e., about 0.5 wt. percent water of the R component, in the reactants, a carbon foam having a density of about 0.4 gm./cc. may be produced. With the same ratio but with the addition of sufficient water to correspond to about 8 w/o of the R component, the resulting density is reduced to about 0.10 gm./cc. An R component with the addition of 20 percent water will produce a foam product with an even lower density of about 0.06 gm./cc. Conversely, the reduction of the water content in the reactant mixture will provide a foam product of greater density. For example, a mixture of reactants similar to that providing the 0.4-gm./cc. foam except for a reduction of the quantity of water in the reactants may be used to provide foam with a density of about 0.7 gm./cc. Accordingly, in view of the affect water has upon the density of the foam product, it may be advantageous to stock both the R component of the urethane system and the binder with a minimum quantity of water so that higher density foams may be readily produced without adding water to the mixture, while lower density foams may be prepared with the same material by merely adding selected quantities of water to the mixture prior to the reaction. The use of Freon as a blowing agent in combination with the water-produced carbon dioxide has been found advantageous when fabricating large foam castings. The quantity of Freon added to the mix, like the water, is dependent upon the density of foam desired.

While the production of the carbon foam described above utilizes the urethane R component to provide the foam producing reaction with the urethane T component, it has been found that the partially polymerized furfuryl alcohol binder may be used as a replacement for the R component. In this type formulation a binder-to-isocyanate prepolymer (T component) ratio as high as about 4 to 1 may be used to provide carbon foam of densities of about 0.02 to 0.19 gm./cc. A relatively large quantity of a catalyst such as noted above and a heated environment, e.g., about 70° C., are preferably utilized for accelerating the otherwise slow reaction between the binder and the T component.

The porous carbon product of this invention exhibits a desirable characteristic in that carbon foam baked at 1000° C. maintains dimensional stability when subjected to variations in the relative humidity of the foam environment even though the foam is somewhat hygroscopic. In fact, soaking the carbon foam in water does not produce dimensional changes of a sufficient magnitude so as to be measurable with usual dimension gauges. If desired, the hygroscopicity of the carbon foam can be somewhat reduced by heat treating the carbon foam at temperatures up to as high as about 2500° C.

Another desirable characteristic of the subject carbon foam is that it may be readily used in high temperature environments which may reach as high as 2500° C. in the absence of an oxidizing atmosphere without suffering any deleterious effects except with the possible exception of a slight decrease in compressive strength at about 2500° C. This decrease in compressive strength is due to graphitization of some of the carbon which results in the weaker structure since the carbon product is stronger under compressive forces than graphite. As an illustration of the difference in the compressive strength of carbon foams of the same densities which have been baked at 1000° C. with respect to those which have been baked at 2500° C., a carbon foam baked at the lower temperature has a compressive strength approximately 30 percent greater than one baked at 2500° C. Normally, the carbon foams that are to be used in environments hotter than 1000° C. are preferably heat treated at a temperature corresponding to or slightly higher than the highest temperature to which the foam is to be exposed.

In addition to the formation of carbon foams from the binder and blowing agent as above described, it may in some instances be desirable to incorporate filler materials in the foam to provide a foam more suitable for a particular application. For example, fillers such as the powders of uranium oxide, alumina, boron, silica, tantalum, tungsten, carbon black, graphite flour, etc., may be used as loading material for the carbon foam. Or, as in some cases such as those which are thoroughly treated in the above-mentioned patent, these same fillers may be used for the production of metallic foamed products which are fabricated by firing the carbon foam in a reactive atmosphere to burn out all the carbon. A typical application in this area would be the formation of a silicon carbide foam which is fabricated by firing a silicon-loaded carbon foam to a temperature above about 2000° C. to form a silicon carbide foam, and thereafter firing the resulting foam in air to burn out the excess carbon.

In order to provide a better understanding of the present invention, there are set forth below illustrative examples of foam producing processes and properties of the foamed product. These examples are merely illustrative and are not intended to be limitations on the scope of the invention.

EXAMPLE I

A mixture was made of 606 grams polyhydric alcohol resin (the "R" component of the urethane system) and 1695 grams of a thermosetting resin binder consisting of partially polymerized furfuryl alcohol containing 10 percent unreacted furfuryl alcohol and of a hydroxyl number of 135. The R component contained a silicone compound cell regulator amounting to about 4 wt. percent of the resin binder. The catalyst N-methyl morpholine was added to the mixture in an amount corresponding to 0.5 wt. percent of the mixture. This mixture was stirred for 5 minutes and then 934 grams of the T component of the urethane system containing tolylene diisocyanate was added to the mixture, which was continually stirred for 2 minutes to assure intimate blending of the materials. The binder-to-urethane ratio for this mixture was approximately 1.1 to 1.

Upon completion of this blending step the mixture was poured into an aluminum mold wherein the foaming of the mixture took place for a duration of about 15 minutes at which time the foaming action ceased and some gelation of the binder and urethanes was present. After about 2 hours the casting was removed from the mold and the skin then removed from the foam with the aid of a metal rasp. The casting was then left at room temperature for about 12 more hours to permit further gelation to occur. The casting was then air cured at room temperature for a period of 15 days.

The casting, upon completion of the air cure, was then placed in a muffle furnace provided with a non-oxidizing atmosphere. The furnace was then run through a programmed cycle for slowing increasing the temperature of the casting from about room temperature to a temperature of 1000° C. This heating cycle was programmed to take place over a duration of 240 hours. During this heatup, the casting was carbonized, with the urethanes being virtually entirely decomposed and the binder converted to carbon.

The porous carbon product resulting from the carbonization of the casting exhibited uniform cell distribution, a density of 0.42 gm./cc., and a compressive strength greater than about 3200 p.s.i.

EXAMPLE II

A carbon foam was prepared as in Example I with the same formulation, except water in an amount corresponding to 20 wt. percent of the R component was added to the mixture prior to the addition of the T component.

The resultant porous carbon product had a density of about 0.06 gm./cc. and a compressive strength of about 80 p.s.i.

EXAMPLE III

A porous carbon product having a density of approximately 0.7 gm./cc. and a compressive strength of about 10,000 p.s.i. was produced by following the formulation and procedure of Example I except the water content in the mixture was reduced to an amount corresponding to 0.2 wt. percent of the R component.

It will be seen that the present invention sets forth a substantially improved porous carbon product which is particularly useful in high temperature environments and when subjected to changing conditions of relative humidity. The fabrication of carbon foams with densities ranging up to about 0.8 gm./cc. further illustrates the improvement over previous porous carbon products such as disclosed in the above-mentioned patent where the densities do not exceed about 0.15 gm./cc. except with the addition of some filler material. Carbon foam with a density of about 1.0 gm./cc. is readily fabricated by adding about 15–20 wt. percent graphite flour to the mixtures, normally providing a density of about 0.8 gm./cc. In fact, the addition of about 6 wt. percent graphite flour to otherwise filler-free formulations may be desirable to change the modulus of elasticity of the foam product for rendering it more suitable for some applications. Among the more important contributions afforded by the present invention are the capabilities of fabricating configurations of substantially larger variations in dimensions and densities than previously enjoyed, together with the preparation of high density porous carbon products which have compressive strengths ranging upwards of 10,000 p.s.i. This latter feature is largely due to increase of the binder-to-urethane ratio that is realized by using a binder consisting of partially polymerized furfuryl alcohol which contains less than 12 percent unreacted furfuryl alcohol.

As various changes may be made in the formulations and the arrangement of the method steps herein without departing from the spirit and scope of the invention and without sacrificing any of its advantages, it is to be understood that all matter herein is to be interpreted as illustrative and not in a limiting sense.

What is claimed is:

1. The method of making a porous carbon body, comprising the steps of admixing a thermosetting resin binder consisting of partially polymerized furfuryl alcohol together with water and a urethane system capable of interacting to form a cellular urethane structure incorporating the binder, said partially polymerized furfuryl alcohol containing less than 12 percent unreacted furfuryl alcohol, possessing a hydroxyl number in the range of about 100 to 140, and resin solids in the range of about 75 to 80 weight percent, the mixture having a binder-to-urethane weight ratio in the range of about 0.45–2.2 to 1, curing the cellular structure resulting from the interaction, and thereafter heating the cellular structure to a temperature sufficient to effect thermal decomposition of the reacted urethane system and the conversion of the binder to carbon for forming said porous carbon body.

2. The method of making a porous carbon body as claimed in claim 1, wherein the urethane system consists essentially of a two-component system comprising polyhydric alcohol resin and tolylene diisocyanate.

3. The method of making a porous carbon body as claimed in claim 2, wherein the curing of the cellular structure is provided by maintaining the latter in air at room temperature for a duration in the range of about 10 to 20 days.

4. The method of making a porous carbon body as claimed in claim 2, wherein the temperature to which the cellular structure is subjected for the thermal decomposition of the gas producing material and the conversion of the binder to carbon is at least about 950° C.

5. The method of making a porous body as claimed in claim 4, including the additional step of heating the carbon product to a temperature in the range of above about 950° to about 2500° C.

6. The method of making a porous carbon body as claimed in claim 2, including the additional step of adding to the mixture at least one of a catalyst for accelerating the polymerization and cross linking of the urethane system and a surfactant for regulating cell size in the reacted urethane system.

7. The method of making a porous carbon body as claimed in claim 2, including the additional step of scoring a rind formed on exposed surface portions of the cellular urethane structure during the interaction of the urethane system prior to the curing of the cellular structure.

8. The method of making a porous carbon body as claimed in claim 7, wherein the step of scoring the rind comprises cutting about 0.5-inch-deep incisions at about 0.5-inch intervals.

9. The method of making a porous carbon body as claimed in claim 2, including the additional step of selectively varying the water content in the mixture prior to said interaction for regulating the density of the carbon body.

References Cited

UNITED STATES PATENTS

| | | | |
|---|---|---|---|
| 2,981,700 | 4/1961 | Parker et al. | 260—2.5 |
| 3,302,999 | 2/1967 | Mitchell | 23—209.2 |
| 3,342,555 | 9/1967 | McMillan | 23—209.4 |
| 3,345,440 | 10/1967 | Googin et al. | 264—29 |
| 3,387,940 | 6/1968 | McHenry et al. | 23—209.2 |
| 3,446,593 | 5/1969 | Moutaud | 23—209.1 |

EDWARD J. MEROS, Primary Examiner

U.S. Cl. X.R.

23—209.1, 209.2; 264—29